US006634743B2

(12) United States Patent
Perchak et al.

(10) Patent No.: US 6,634,743 B2
(45) Date of Patent: Oct. 21, 2003

(54) METHOD FOR INCREASING THE DIAMETER OF AN INK JET INK DOT

(75) Inventors: Dennis R. Perchak, Penfield, NY (US); Kam C. Ng, Rochester, NY (US); Kwok L. Yip, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/006,916

(22) Filed: Nov. 29, 2001

(65) Prior Publication Data

US 2003/0098903 A1 May 29, 2003

(51) Int. Cl.[7] ............................ B41J 2/01; B32B 27/14
(52) U.S. Cl. ........................ 347/101; 347/105; 428/195
(58) Field of Search ................................ 347/105, 106, 347/100, 96, 101; 428/195; 346/135.1

(56) References Cited

U.S. PATENT DOCUMENTS 6,089,704 A * 7/2000 Burns et al. ................ 347/105
6,110,585 A * 8/2000 Shaw-Klein ................ 347/105
6,114,022 A * 9/2000 Warner et al. .............. 347/106

* cited by examiner

*Primary Examiner*—Judy Nguyen
*Assistant Examiner*—Manish Shah
(74) *Attorney, Agent, or Firm*—Harold E. Cole

(57) ABSTRACT

A method for increasing the diameter of an ink jet ink dot resulting from the application of an ink jet ink drop applied to the surface of an inkjet recording medium having a support having thereon an image-receiving layer and an overcoat layer, the ink penetration rate of the overcoat layer being faster than the ink penetration rate of the image-receiving layer; having the steps of: a) applying the overcoat layer on top of the image-receiving layer at a thickness less than the maximum thickness, the maximum thickness being that thickness whereby an ink jet ink drop applied to the surface of the overcoat layer will not substantially penetrate the surface of the image-receiving layer; and b) applying the ink jet ink drop on the surface of the overcoat layer whereby the diameter of the ink jet ink dot is increased relative to that which would have been obtained if the overcoat layer had been coated at a thickness of at least the maximum thickness.

19 Claims, No Drawings

METHOD FOR INCREASING THE DIAMETER OF AN INK JET INK DOT

FIELD OF THE INVENTION

The present invention relates to a method for increasing the diameter of an ink jet ink dot.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An inkjet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of ink jet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by cast coating, in which a particulate-containing coating is applied to a support and is dried in contact with a polished smooth surface.

When an ink drop contacts the ink jet recording medium, the drop initially spreads on the surface and then begins to adsorb into the medium. The ink adsorbs vertically into the medium as well as radially. The rate of ink adsorption depends on the nature of the medium. Ink adsorption in non-porous media comprising hydrophilic polymers takes place due to molecular diffusion and occurs at a much slower rate than for porous media where the ink adsorption occurs due to capillary action. The adsorption of the ink drop transports a colorant into the medium to form the image.

The diameter of the resulting colorant in the medium is referred to as dot size. Dot size is an important parameter in ink jet printing systems and is a key component in establishing image quality and printer productivity. Smaller dot sizes yield a gain in edge acuity but decrease printer productivity. Larger dot sizes can cover up for printing errors due to misplaced drops. Therefore, the ability to control dot size is an important issue for ink jet printing systems.

Dot gain refers to the increase in dot size over the initial, spherical drop diameter. The dot gain is determined by the ratio of the final dot diameter to the initial drop diameter. The desired dot size is typically achieved by controlling the drop volume, i.e., larger volume drops produce larger dot sizes in the medium. It would be desirable to find a way to increase dot size without having to increase drop volume.

U.S. Pat. No. 6,114,022 relates to a method for controlling the dot diameter on an ink jet receptive medium that employs a microporous medium and a porous imaging layer. The dot gain achieved by this process is about 3.5. However, there are problems with this method in that the amount of dot gain is not as large as one would like and the process is limited to pigmented inks.

It is an object of this invention to provide a method for increasing the dot gain of an ink jet ink drop applied to an ink jet recording element in an amount of up to about 10. It is another object of the invention to provide a method for increasing the diameter of an ink jet ink dot resulting from the application of an ink jet ink drop wherein the ink jet ink comprises a dye.

SUMMARY OF THE INVENTION

These and other objects are achieved in accordance with the invention which comprises a method for increasing the diameter of an ink jet ink dot resulting from the application of an ink jet ink drop applied to the surface of an ink jet recording medium comprising a support having thereon an image-receiving layer and an overcoat layer, the ink penetration rate of the overcoat layer being faster than the ink penetration rate of the image-receiving layer; comprising the steps of:

a) applying the overcoat layer on top of the image-receiving layer at a thickness less than the maximum thickness, the maximum thickness being that thickness whereby an ink jet ink drop applied to the surface of the overcoat layer will not substantially penetrate the surface of the image-receiving layer; and b) applying the inkjet ink drop on the surface of the overcoat layer whereby the diameter of the ink jet ink dot is increased relative to that which would have been obtained if the overcoat layer had been coated at a thickness of at least the maximum thickness.

By use of the method of the invention, the dot gain of an ink jet ink drop applied to an ink jet recording element can be in an amount of up to about 10 and the ink jet ink can comprise a dye.

Another advantage of the invention is that smaller volume of ink jet ink drops can be used to achieve dot sizes equivalent to those obtained with larger volume drops. This results in increased printer productivity since fewer dots are needed to cover an area of the recording medium, and the drying times are faster.

DETAILED DESCRIPTION OF THE INVENTION

The support for the ink jet recording medium used in the invention can be any of those usually used for ink jet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683;and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint. In a preferred embodiment, polyethylene-coated paper is employed.

The support used in the invention may have a thickness of from about 50 to about 500 μm, preferably from about 75 to 300 μm. Antioxidants, antistatic agents, plasticizers and other known additives may be incorporated into the support, if desired.

In order to improve the adhesion of the ink-receiving layer to the support, the surface of the support may be subjected to a corona-discharge treatment prior to applying the image-receiving layer.

The image-receiving layer which may be used in the invention can either be porous or non-porous. If the image receiving layer is porous, it would comprise organic or inorganic particles dispersed in a polymeric binder. In a preferred embodiment of the invention, the polymeric binder is a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. In another preferred embodiment of the invention, the hydrophilic polymer is poly(vinyl alcohol), hydroxypropyl cellulose, hydroxypropyl methyl cellulose, gelatin, or a poly(alkylene oxide). In yet still another preferred embodiment, the hydrophilic binder is poly(vinyl alcohol). The polymeric binder should be chosen so that it is compatible with the aforementioned particles.

Examples of particles useful in the image-receiving layer employed in the invention include alumina, fumed alumina, colloidal alumina, boehmite, clay, calcium carbonate, titanium dioxide, calcined clay, aluminosilicates, silica, colloidal silica, fumed silica, barium sulfate, or polymeric beads such as vinyl chloride/vinyl acetate or urethane. The particles may be porous or nonporous.

The particles may also be polymeric particles comprising at least about 20 mole percent of a cationic mordant moiety useful in the invention can be in the form of a latex, water dispersible polymer, beads, or core/shell particles wherein the core is organic or inorganic and the shell in either case is a cationic polymer. Such particles can be products of addition or condensation polymerization, or a combination of both. They can be linear, branched, hyper-branched, grafted, random, blocked, or can have other polymer microstructures well known to those in the art. They also can be partially crosslinked. Examples of core/shell particles useful in the invention are disclosed and claimed in U.S. patent application Ser. No. 09/772,097, of Lawrence et al., filed Jan. 26, 2001, the disclosure of which is hereby incorporated by reference.

In a preferred embodiment of the invention, the organic or inorganic particles have a particle size of from about 0.01 μm to about 0.1 μm, preferably from about 0.03 μm to about 0.07 μm.

If the image-receiving layer is non-porous, it would comprise a hydrophilic polymer as described above, preferably gelatin or poly(vinyl alcohol).

As noted above, the ink penetration rate of the image-receiving layer is less than the ink penetration rate of the overcoat layer. If the image-receiving layer is a hydrophilic polymer and the overcoat layer is porous, then the relative ink penetration rates will inherently be obtained. If the image-receiving layer is porous, then its penetration rate can be modified using various factors such as pore size, porosity, surface structure of the pores, topology of the pores, etc. The ink penetration rate of the overcoat layer can be controlled in the same manner.

The overcoat layer which may be employed in the invention can be virtually any material provided it has the penetration rate relationship as described above. In a preferred embodiment of the invention, the overcoat layer is comprised of a porous material. This material may be formed of particles and a binder as described above for the image-receiving layer.

Porosity of the overcoat layer is desirable in order to obtain rapid transport of the ink into the media. The pores formed between the particles must be sufficiently large and interconnected so that the printing ink passes quickly through the layer and away from the outer surface. Under these conditions, if the underlying image-receiving layer is non-porous, that is, a hydrophilic polymer, then the adsorption rate of the overcoat layer will automatically be in the range of 100–10000 times that of the image-receiving layer, thus satisfying the criteria for the invention.

If the image-receiving layer and overcoat layer both comprise particles in a binder, then the particles in the porous image-receiving layer should have a smaller particle size than the particles in the porous overcoat layer. The thickness of the overcoat layer will depend on the properties of the overcoat layer and the desired dot size.

As noted above, the image-receiving layer and overcoat layer must be constructed such that the overcoat layer adsorbs ink faster than the image-receiving layer. This difference in adsorption rates yields a kinetic mismatch in the rate at which fluid is transported between the overcoat layer and the image-receiving layer. It is believed that the adsorption of the drop occurs in the following manner: First the drop penetrates the overcoat layer until the liquid reaches the image-receiving layer. Because the image-receiving layer adsorbs fluid more slowly than the overcoat layer, the fluid will begin to spread radially inside the overcoat layer before it begins to significantly adsorb into the image-receiving layer. The amount of this radial spreading, or dot gain, is inversely proportional to the thickness of the overcoat layer and directly proportional to the relative difference in adsorption rates between the overcoat layer and the image-receiving layer.

As noted above, the overcoat layer is applied on top of the image-receiving layer at a thickness less than the maximum thickness, the maximum thickness being that thickness whereby an ink jet ink drop applied to the surface of the overcoat layer will not substantially penetrate the surface of the image-receiving layer. Thus, decreasing the thickness of the overcoat layer results in maximizing the increase in diameter of the ink jet ink dots, or dot gain.

To improve colorant fade, UV absorbers, radical quenchers or antioxidants may also be added to the image-receiving layer as is well known in the art. Other additives include pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30 per cent active coating aid based on the total solution weight. These coating aids can be nonionic, anionic, cationic or amphoteric. Specific examples are described in MCCUTCHEON's Volume 1: Emulsifiers and Detergents, 1995, North American Edition.

Ink jet inks used to image the recording elements employed in the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

In the preferred embodiment of the invention, the amount of the ink jet ink drop is from about 0.1 to about 40 picoliters, pL, and the thickness of the overcoat layer is from about 0.01 μm to about 1.0 μm. In another preferred embodiment, the amount of the ink jet ink drop is from about 1 to about 10 pL and the thickness of the overcoat layer is from about 0.1 μm to about 0.5 μm.

In a preferred embodiment of the invention, the ink jet ink drop has a dye concentration inversely proportional to the thickness of the overcoat layer. In another preferred embodiment of the invention, the ratio of the ink penetration rate of the overcoat layer to the ink penetration rate of the image-receiving layer is from about 100:1 to about 10,000:1.

The following example is provided to illustrate the invention.

EXAMPLE

Base Line Element (Other Elements are Compared to This)

A coating solution for the image-receiving layer was prepared by combining poly(vinyl alcohol) (Gohsenol® GH-23A, Nippon Gohsei Co.), and mordant polymeric particles of a copolymer of (vinylbenzyl) trimethylammonium chloride and divinylbenzene (87:13 molar ratio), in a ratio of 80:20 to give an aqueous coating formulation.

A coating solution for the overcoat layer was prepared by combining fumed alumina (Cab-O-Sperse® PG003, Cabot Corp.), poly(vinyl alcohol) (Gobsenol® GH-23A, Nippon Gobsei Co., Ltd.) and 2,3-dihydroxy-1,4-dioxane (Clariant Corp.) in aratio of 88:10:2 to give an aqueous coating formulation of 30% solids by weight.

The layers were simultaneously bead-coated at 40° C. on polyethylene-coated paper base, which had been previously subjected to corona discharge treatment. The overcoat layer was coated on top of the image-receiving layer. The coating weight of the overcoat layer was 1.08 g/m$^2$. The coating was then dried at 60° C. by forced air to yield a two-layer recording element in which the thicknesses of the overcoat and image-receiving layers were 0.8 μm and 39 μm, respectively.

Element 1 of the Invention

Element 1 was prepared the same as the Base Line Element except that the coating weight was 0.86 g/m$^2$ and the thicknesses of the overcoat and image-receiving layers were 0.64 μm and 39 μm, respectively.

Element 2 of the Invention

Element 2 was prepared the same as the Base Line Element except that the coating weight was 0.65 g/m$^2$ and the thicknesses of the overcoat and image-receiving layers were 0.48 μm and 39 μm, respectively.

Element 3 of the Invention

Element 3 was prepared the same as the Base Line Element except that the coating weight was 0.43 g/m$^2$ and the thicknesses of the overcoat and image-receiving layers were 0.32 μm and 39 μm, respectively.

Element 4 of the Invention

Element 4 was prepared the same as the Base Line Element except that the coating weight was 0.22 g/m$^2$ and the thicknesses of the overcoat and image-receiving layers were 0.16 μm and 39 μm, respectively.

Dot Gain for 0.63 pL

Test images of black drops were printed on the above elements using a typical ink jet print head using the Black Ink Composition described below. The drop volume was 0.63 pL corresponding to a drop diameter of 10.64 μm. The resulting dot size was measured relative to the sphere diameter and the dot gain or spread factor is reported in Table 1.

Black Ink Composition

The black ink contained 8% Reactive Black 31 black dye, 20% diethylene glycol, and the balance water.

Dot Gain for 1.5 pL

This test was performed the same as Dot Gain for 0.63 pL, except that the drop volume was 1.5 pL corresponding to a drop diameter of 14.2 μm.

Dot Gain for 2.8 pL This test was performed the same as Dot Gain for 0.63 pL, except that the drop volume was 2.8 pL corresponding to a drop diameter of 17.49μm.

Dot Gain for 9.83 pL

Test images of cyan drops were printed on the above elements using a typical ink jet print head using the Cyan Ink Composition 1 described below. The drop volume was 9.83 pL corresponding to a drop diameter of 26.58 μm. The resulting dot size was measured relative to the sphere diameter and the dot gain or spread factor is reported in Table 1.

Cyan Ink Composition 1

The cyan ink contained 24.3% glycerol, 8% polyethylene glycol monobutyl ether, 0.2% triethanolamine, 2% Acid Blue 9 dye, and the balance water. The pH was 7.9.

Dot Gain for 19.2 pL

Test images of cyan drops were printed on the above elements using a typical ink jet print head using Cyan Ink Composition 2 described below. The drop volume was 19.2 pL corresponding to a drop diameter of 33.22 μm. The resulting dot size was measured relative to the sphere diameter and the dot gain or spread factor is reported in Table 1.

Cyan Ink Composition 2

The cyan ink contained 40% diethylene glycol, 2% Direct Blue 199 dye, 25% diethylene glycol monobutyl ether, and the balance water. The pH was 6.2.

The following results were obtained:

TABLE 1

| Element | Overcoat thickness (μ) | Dot Gain for Drop Volumes Of (pL) | | | | |
|---|---|---|---|---|---|---|
| | | 0.63 | 1.50 | 2.80 | 9.83 | 19.20 |
| Base Line | 0.80 | 1.81 | 1.53 | 1.67 | 2.36 | 8.38 |
| 1 | 0.64 | 1.81 | 1.62 | 1.75 | 2.87 | 8.75 |
| 2 | 0.48 | 1.79 | 1.69 | 1.80 | 3.08 | 10.76 |
| 3 | 0.32 | 1.94 | 1.84 | 1.94 | 3.91 | 11.74 |
| 4 | 0.16 | 1.99 | 1.87 | 1.94 | 4.28 | 10.60 |

The above results show that for a given drop volume, as the thickness of the overcoat layer is decreased, the dot gain increases.

Although the invention has been described in detail with reference to certain preferred embodiments for the purpose of illustration, it is to be understood that variations and modifications can be made by those skilled in the art without departing from the spirit and scope of the invention.

What is claimed is:

1. A method for increasing the diameter of an ink jet ink dot resulting from the application of an ink jet ink drop applied to the surface of an ink jet recording medium comprising a support having thereon an image-receiving layer and an overcoat layer, the ink penetration rate of said overcoat layer being faster than the ink penetration rate of said image-receiving layer wherein the ratio of the ink penetration rate of said overcoat layer to the ink penetration rate of said image-receiving layer is from about 100:1 to about 10,000:1; comprising the steps of:

a) applying said overcoat layer on top of said image-receiving layer at a thickness less than the maximum thickness, said maximum thickness being that thickness whereby an ink jet ink drop applied to the surface of said overcoat layer will not substantially penetrate the surface of said image-receiving layer; and b) applying said ink jet drop on said surface of said overcoat layer whereby the diameter of said ink jet ink dot is increased relative to that which would have been obtained if said overcoat layer had been coated at a thickness of at least said maximum thickness.

2. The method claim 1 wherein the amount of said ink jet ink drop is from about 0.01 to about 40 picoliters and the thickness of said overcoat layer is from about 0.01 μm to about 1.0 μm.

3. The method claim 1 wherein the amount of said ink jet ink drop is from about 1 to about 10 picoliters and the thickness of said overcoat layer is from about 0.1 μm to about 0.5 μm.

4. The method claim 1 wherein said overcoat layer is porous.

5. The method claim 4 wherein said porous overcoat layer comprises organic or inorganic particles and a binder.

6. The method claim 5 wherein said organic or inorganic particles comprise alumina, fumed alumina, colloidal alumina, boehmite, clay, calcium carbonate, titanium dioxide, calcined clay, aluminosilicates, silica, colloidal silica, fumed silica, barium sulfate, vinyl chloride/vinyl acetate or urethane.

7. The method claim 5 wherein said organic or inorganic particles have a particle size of from about 0.01 μm to about 0.1 μm.

8. The method claim 7 wherein said organic or inorganic particles have a particle size of from about 0.03 μm to about 0.07 μm.

9. The method claim 4 wherein said binder comprises poly(vinyl alcohol), hydroxypropyl cellulose, hydroxypropyl methyl cellulose, gelatin, or a poly(alkylene oxide).

10. The method claim 1 wherein said image-receiving layer is non-porous.

11. The method claim 10 wherein said image-receiving layer comprises a hydrophilic material.

12. The method of claim 11 wherein said hydrophilic material is gelatin or poly(vinyl alcohol).

13. The method claim 1 wherein said image-receiving layer is porous and comprises organic or inorganic particle and a binder.

14. The method claim 13 wherein said organic or inorganic particles comprise alumina, fumed alumina, colloidal alumina, boehmite, clay, calcium carbonate, titanium dioxide, calcined clay, aluminosilicates, silica, colloidal silica, fumed silica, barium sulfate, vinyl chloride/vinyl acetate or urethane.

15. The method claim 13 wherein said overcoat layer comprises organic or inorganic particles and a binder, and said organic or inorganic particles in said porous image-receiving layer have a smaller particle size than the particles in said porous overcoat layer.

16. The method claim 1 wherein said ink has a dye concentration inversely proportional to the thickness of the overcoat layer.

17. The method of claim 1 wherein said support is polyethylene-coated paper.

18. The method of claim 1 wherein said ink jet ink drop comprises a dye dispersed in water.

19. A recording element comprising a support having thereon an image-receiving layer and an overcoat layer, the ink penetration rate of said overcoat layer being faster than the ink penetration rate of said image-receiving layer, wherein:

a) said overcoat layer is on top of said image-receiving layer and has a thickness less than the maximum thickness, said maximum thickness being that thickness whereby an ink jet ink drop applied to the surface of said overcoat layer will not substantially penetrate the surface of said image-receiving layer, and b) the ratio of the ink penetration rate of said overcoat layer to the ink penetration rate of said image-receiving layer is from about 100:1 to about 10,000:1.

* * * * *